July 25, 1950
H. HURVITZ
2,516,389
PANORAMIC AZIMUTH RECORDER
Filed April 25, 1947
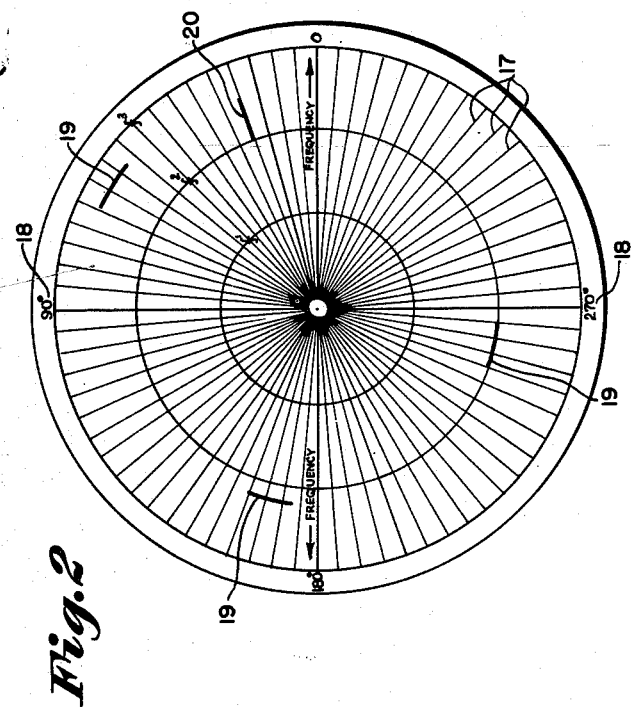
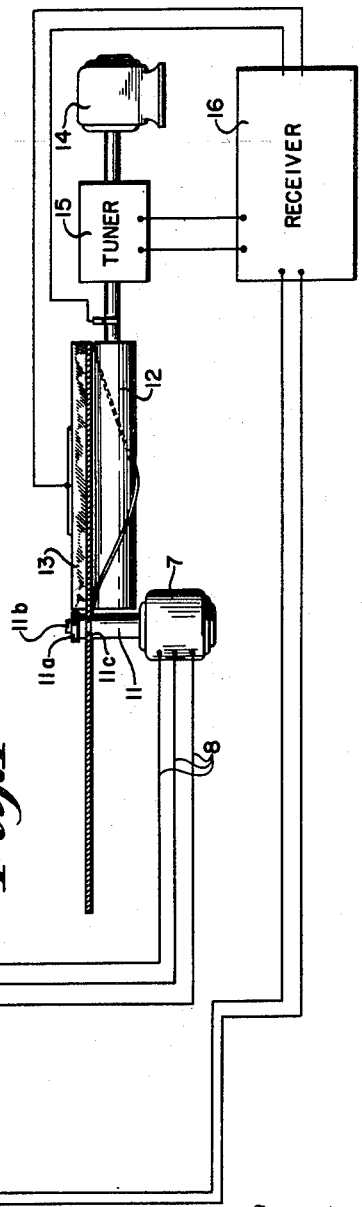
Fig.2
Fig.1
Inventor
Hyman Hurvitz Patented July 25, 1950

2,516,389

UNITED STATES PATENT OFFICE 2,516,389

PANORAMIC AZIMUTH RECORDER

Hyman Hurvitz, Washington, D. C., assignor of one-half to Marcel Wallace, doing business as Panoramic Laboratories of East Portchester, Conn., and one-half to Panoramic Radio Corporation, New York, N. Y., a corporation Application April 25, 1947, Serial No. 743,975

10 Claims. (Cl. 346—33)

This invention relates generally to recording systems, and more particularly to recording systems for plotting continuously the frequencies of a plurality of transmitters, as well as the values of azimuthal angle, as measured from a predetermined location, with respect to which transmissions occur.

It is an object of the invention to provide a recording system for scanning the range of values of a set of quantities of like nature, such as frequencies of signal transmitting stations, and for continuously plotting these values against azimuth in polar coordinates, providing a continuous time record of variations of frequency and azimuth of each of a plurality of sources of wave energy.

It is still a further object of the present invention to associate a space scanning recorder with a frequency scanning or panoramic type of directional radio receiver, for simultaneous scanning of a band of frequencies and of a record receiving line in space, the recorder being responsive to the output of the receiver to create a mark on said line upon each receipt of a radio signal by the receiver, and in which the angular orientation of the line in space is coordinated continuously with the azimuthal directivity of the radio receiver.

It is still a further object of the invention to provide a recorder having a record receiving surface which remains stationary in respect to longitudinal feed while a time varying record is impressed thereon by a space scanning recording mechanism.

It is another object of the invention to provide a recorder having a helical platen type of marking device and a record receiving surface, the marking device being oriented radially with respect to a relative rotary motion provided as between the marking device and the record receiving surface.

It is a further object of the invention to provide, in conjunction with a directional panoramic or frequency scanning receiver, a recorder for providing a plot in polar coordinates of the frequency values of received signals and of the directions from which the signals arrive at the receiver.

The above and still further objects, features and advantages of the invention will become apparent upon study of the following detailed description of specific embodiments of my invention, especially when taken in conjunction with the accompanying drawings, wherein:

Figure 1 is a conventionalized mechanical representation of a recording system in accordance with the invention, circuit details being illustrated primarily in terms of functional block diagram.

Figure 2 is a plan view of a record receiving member utilized in the present invention, and displaying a characteristic set of records such as is provided by the system.

Considered in its simplest aspect, a preferred embodiment of my invention involves a radio receiver adapted for scanning a range of frequencies at a rapid rate, and which provides a response upon coincidence of an existing frequency with the tuning of the receiver. Space scanning of a record receiving surface may take place simultaneously and isochronously with the frequency scanning, as by means of a helical platen and a linear marking device, associated therewith, and adapted to make a mark on the receiving surface upon response of the receiver. The receiver may be provided with a unidirectional antenna, which scans slowly in azimuth, and the record receiving surface may likewise be rotated with respect to the helical platen and its marker device, the latter elements consituting a radius vector from the geometrical center of the surface. Space scanning thus takes place along successive radii as the record receiving paper rotates, and a plot is provided of received frequencies versus azimuths from which the signals originate.

Referring now more specifically to the drawings, the reference numeral 1 denotes a unidirectional antenna, suitable for receiving signals over a band of frequencies $f_1$ to $f_2$ inclusive, which may be of interest. The antenna 1 is mounted on a hollow shaft or pedestal 2, within which extend leads 3 connected to the dipole 4, mounted within the reflector of the antenna 1. The pedestal 2, and with it the antenna 1, are rotated continuously and relatively slowly in azimuth by means of a drive motor 5, which may be supplied with power in any convenient manner (not illustrated). The motion of the shaft 2 is transmitted to a recording station by means of a Selsyn drive 6, mechanically coupled to the shaft 2, and which transmits its position representative signal to a Selsyn repeater 7 over leads 8. The Selsyn repeater drives a relatively stiff circular paper recording surface 9 in isochronism with the motion of the antenna 1, the said record receiver being suitably calibrated in terms of angle of rotation about its periphery, as illustrated in Figure 2 of the drawings. The record receiving disc 9 may be secured to the shaft 11 of the Selsyn repeater 7 in any convenient manner, as by means of a thumb nut 11a, threadedly secured to a threaded extension 11b of the shaft 11, the extension 11b being materially reduced in diameter to provide a supporting shoulder 11c at the junction of shaft 11 and extension 11b, upon which rests the record- ing receiving disc 9.

Recording may be accomplished by positioning radially under the disc 9 a helical platen 12, of the type commonly utilized in facsimile recording, and placing above the disc 9 a marker member 13, for cooperating with the helical platen, in known manner. The record receiving disc 9 may be arranged to have sufficient stiffness to enable retention of its shape and flatness during many recording cycles, without support other than that provided by the shoulder 11b, of the shaft 11.

The helical platen 12 is driven at a relatively rapid speed, say at 15 cycles per second, by a motor 14, which also drives a variable tuner 15 such as a variable air condenser or the like, which is associated with the radio receiver 16, and which serves to vary the tuning of the receiver 16 over the band of frequencies $f_1$ to $f_2$ inclusive, in accordance with a linear law of variation of frequency with time. The tuner 15 may consist of a variable condenser comprising stationary plates between which is driven a dielectric mounted on the shaft of motor 14 and which has a configuration such as to provide the required variation of frequency with shaft rotation. Reference is made to U. S. Patent #2,273,914, issued to M. Wallace, for complete details of the structure and mode of operation of a suitable frequency scanning receiver, and since such receivers are presently well understood per se, a more complete explanation thereof is dispensed with in the present specification, to avoid undue and unnecessary complication thereof.

By reason of the isochronous motion of the tuner 15 and of the helical platen 12, each frequency to which the receiver 15 is tuned corresponds with a different but definitely determined recording position radially of the record receiving surface 9, and since the azimuthal rotation of the antenna 4 and of the record receiving surface 9 may be extremely slow, say at the rate of 5 to 10 degrees of arc per second, it may be assumed to a first approximation that radial lines of the record receiver 9 are scanned, and that marks are made at radial positions corresponding with the frequency positions of received signals within a predetermined spectrum of frequencies. By reason of the simultaneous azimuthal scanning of the antenna 4 and of the record receiver 9, successive angularly displaced radius vectors are scanned so that as the frequency picture varies with direction so will the record provided by the recorder vary, and upon completion of a cycle of rotation of the antenna 4 and of the receiver 9a complete plot will have been accomplished of the frequencies and azimuthal orientations of all the transmitters within receiving radius of the equipment and having frequencies falling within the receiving range of the receiver 16.

As time progresses and successive cycles of recording are completed, should there be modifications of azimuthal directivity as between the receiving station and any of the transmitting stations which are subject to recording, the marks corresponding with that station, on the record receiving surface 9, will vary in angular position. Should the frequency of a transmitting station shift, the mark corresponding with that station will vary in position radially.

Referring specifically to Figure 2 of the drawing, there is presented a plan view of a record receiving surface or disc 9, having radial calibration lines 17 imprinted thereon which may be identified azimuthally by means of suitable notations 18. A plurality of representative recordings are presented in the disc 9, some of which, identified by the numerals 19, represent transmitting stations operating at constant frequency, and which have, over a period of time, varied directions with respect to the receiving and recording station, but have not varied in frequency, as indicated by the constancy of the radius vector of the lines 19, and by the extensive range of azimuthal angles covered thereby. A transmitting station which remains constant in relative azimuth, but which varies in frequency, provides a recording such as that identified by the numeral 20, having a constant angle but extending over a range of values of radius vector.

The device of the present invention may be applied with advantage in many situations. Its primary value may perhaps be found in connection with frequency monitoring stations, and in connection with radio and radar countermeasures. In such application, the existence of transmission in a given frequency range is sought, and when discovered, the direction from which the transmission originates is of great interest. In the past, when conventional receivers have been utilized, it has been essential to have an operator listen for such transmissions, modifying the tuning of the receivers periodically. With the advent of panoramic or frequency scanning receivers it became possible visually to guard a band of frequencies, by watching the screen of a cathode ray tube indicator associated with the receiver. It was, nevertheless, still essential to maintain a continuous visual watch.

With the present system it becomes possible to monitor automatically a band of frequencies for transmissions occurring anywhere in the band, and to provide a continuous record and indication not only of the frequencies of transmission but also of the directions from which they originate. A continuous monitoring watch need not be maintained, but the record may be examined at relatively infrequent intervals to determine whether transmissions are in progress or have taken place. Advantages further accrue because the records made are permanent and may be examined and interpreted at leisure. Further, use of a recorder enables indications to be spread out on surfaces of considerable dimensions, as compared with the space available on the face of a cathode ray tube, providing relatively great accuracy of indication.

While I have described one specific embodiment of my invention, it will be clear that modifications thereof may be resorted to without departing from the true spirit and scope of the invention as defined by the appended claims.

What I claim and desire to secure by Letters Patent of the United States is:

1. In combination, a unidirectional antenna for receiving signals having frequencies occurring at random in a predetermined frequency spectrum, a tunable radio receiver tunable over said predetermined frequency spectrum, means for periodically tuning said tunable radio receiver over said predetermined frequency spectrum at a predetermined high periodicity, a recorder having a line scanning marking means and means for rotating a record receiving surface, means for rotating said antenna at a predetermined relatively slow angular rate, means coordinated with rotative motion of said antenna for effecting relative rotation of said marking means and of said means for moving said record receiving surface, and means synchronized with said means for periodically tuning for effecting relative radial movement of said marking means and said record receiving surface.

2. In combination, an antenna having a unidirectional reception pattern for receiving signals having frequencies occurring at random in a predetermined frequency spectrum, a frequency scanning tunable receiver for receiving said signals by varying the tuning of said receiver periodically over said frequency spectrum at a relatively rapid rate, means for rotating said pattern at a relatively slow rate, a recorder having means for moving a record receiving surface about an axis perpendicular to said surface, a marking means comprising a rotating helical line scanning element and a stationary linear element arranged collinearly with the axis of rotation of said rotating helical line scanning element and tangentially of said helical line scanning element, said record receiving surface being located intermediate said helical line scanning element and said stationary linear element, means for rotating said helical line scanning element in synchronism with the periodic scanning of said frequency scanning system, means for synchronizing said means for moving said record receiving surface about said axis with rotation of said pattern, and means responsive to reception of a signal by said frequency scanning system for actuating said marking means to make a record on said record receiving surface during reception of said signal, the relation of said relatively rapid rate to said relatively slow rate being such that said pattern is substantially motionless during each periodic tuning of said receiver.

3. In a directional receiver system, the combination comprising, a tunable receiver, means for periodically tuning said receiver over a range of frequencies to determine the presence of signals in said range of frequencies, a recorder comprising a marking means and means for supporting a record receiving surface having a circular record receiving area, means for periodically moving said marking means substantially radially of said area in synchronism with tuning of said receiver over said range of frequencies, means responsive to determination of the presence of a signal in said range of frequencies by said receiver to actuate said marking means to create a mark on said record receiving surface, and means for selecting a radius of said record receiving area for receiving said mark in correspondence with the bearing of said signal.

4. In a directional multi-frequency radio receiver, means for periodically varying the tuning of said receiver over a range of frequencies, a recorder comprising means for supporting a record receiving surface calibratable in polar coordinates, a rotatable antenna for receiving signals from different bearings in succession, means coupling said antenna to said receiver to supply said signals thereto, a line scanning marking element for marking said record receiving surface, means for actuating said line scanning marking element in synchronism with said tuning for marking said record receiving surface at radial points of said polar coordinates representative of the frequencies of signals received by said radio receiver and in synchronism with said rotatable antenna for marking said record receiving surface at angular positions of said polar coordinates representative of the bearings of said signals received by said radio receiver, said tuning means tuning over said range of frequencies while said rotatable antenna receives said signals substantially on one only of said bearings.

5. A directional receiver comprising an antenna having rotatable directivity for intercepting radio signals, a frequency scanning radio receiver for responding in sequence to successive values of the frequencies of signals intercepted by said antenna, means for rotating a rotatable record receiving surface, the axis of rotation of which is perpendicular to said surface, means for coordinating rotation of said rotatable directivity and of said rotatable record receiving surface, means responsive to response of said radio receiver to each signal intercepted by said antenna for creating a mark on said record receiving surface, and means for radially determining the location of said mark in accordance with the frequency of said signal as determined by said frequency scanning radio receiver.

6. A recording directional receiver comprising, a tunable radio receiver, frequency scanning means for periodically varying the tuning of said radio receiver over a predetermined range of frequencies, means for rotating a rotatable record receiving surface, a radial scanning marker for periodically scanning radii of a circle defined by rotation of said record receiving surface, means for synchronizing periodic scanning of said radial scanning marker with periodic tuning of said frequency scanning means, an antenna having a rotatable directional pattern for intercepting signals for said tunable radio receiver, and means for synchronizing rotation of said directional pattern with rotation of said record receiving surface, said pattern rotating through less than 5° of arc for each periodic variation of tuning of said radio receiver over said predetermined range of frequencies.

7. In combination, an antenna system for receiving signals having frequencies occurring at random in a predetermined frequency spectrum, a frequency scanning receiver for receiving said signals in sequence by tuning said receiver periodically over said frequency spectrum at a first relatively high predetermined rate, means for rotating the directional receiving pattern of said antenna system at a relatively low angular rate, a recorder having means for rotating a record receiving surface rotatable about an axis perpendicular to said surface, marking means comprising a rotating helical line scanning element and a stationary linear element arranged collinearly with the axis of rotation and substantially tangentially of said rotating helical line scanning element, said record receiving surface being located intermediate said helical line scanning element and said stationary linear element, means for rotating said helical line scanning element in synchronism with the periodic tuning of said frequency scanning receiver, means for rotating said record receiving surface about its axis in synchronism with rotation of the receiving pattern of said antenna system, and means responsive to reception of a signal by said frequency scanning receiver for actuating said marking means to make a record on said record receiving surface during reception of said signal, said directional receiving pattern remaining substantially stationary during each single tuning of said receiver over said frequency spectrum.

8. In a directional multi-frequency radio receiver periodically tunable over a band of frequencies at a first periodicity, a recorder comprising means for supporting a record receiving surface calibratable in polar coordinates, an antenna having a slowly rotatable reception pattern for receiving signals from different bearings in succession, a line scanning marking element for marking said record receiving surface, means for actuating said line scanning marking element for marking said record receiving surface at radial points of said polar coordinates representative of frequencies of signals received by said radio receiver and at angular positions of said polar coordinates representative of the bearings of said signals, a period of tuning of said tunable receiver timed to occur during rotation of said antenna through relatively few degrees of arc.

9. A directional receiving system comprising an antenna system having a slowly rotatable reception pattern for intercepting radio signals, a frequency scanning receiver periodically tunable over a band of frequencies at a first periodicity for determining the frequencies of signals intercepted by said directional antenna, a recorder comprising means for rotating a rotatable record receiving surface the axis of rotation of which is perpendicular to said surface, means for coordinating motion of said reception pattern and of said rotatable record receiving surface, means responsive to interception of a signal by said antenna system for creating a mark on said record receiving surface, and means for radially determining the location of said mark in accordance with the frequency of said signal as determined by said frequency scanning spectrum analyzer, said receiver tuning through said band of frequencies during rotation of said reception pattern over relatively few degrees of arc.

10. A recording directional receiver comprising, a tunable radio receiver, means for periodically rapidly varying the tuning of said radio receiver over a predetermined range of frequencies, a recorder comprising means for rotating a rotatable record receiving surface, a substantially radially scanning marker for periodically scanning substantially radii of a circle defined by rotation of said record receiving surface, means for synchronizing periodic scanning of said radially scanning marker with periodic tuning of said radio receiver, an antenna system having a slowly rotatable directional pattern for intercepting signals for said tunable radio receiver, and means for synchronizing rotation of said directional receiving pattern with rotation of said record receiving surface, tuning over said range of frequencies occurring during rotation of said directional pattern through a relatively small number of degrees of arc.

HYMAN HURVITZ.

REFERENCES CITED

The following references are of record in the file of this patent:

UNITED STATES PATENTS

| Number | Name | Date |
|---|---|---|
| 620,326 | Jaeger | Feb. 28, 1899 |
| 2,279,246 | Podliasky et al. | Apr. 7, 1942 |
| 2,414,221 | Bristol | Jan. 14, 1947 |
| 2,430,283 | Epstein | Nov. 4, 1947 |
| 2,430,307 | Smith | Nov. 4, 1947 |
| 2,437,243 | Curtis | Mar. 9, 1948 |